US012644564B2

(12) United States Patent
Martin

(10) Patent No.: US 12,644,564 B2
(45) Date of Patent: Jun. 2, 2026

(54) UNDERGROUND STORAGE SYSTEM FOR FLUID STORAGE

(71) Applicant: VALLOUREC OIL AND GAS FRANCE, Aulnoye-aymeries (FR)

(72) Inventor: Pierre Martin, Meudon (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 65 days.

(21) Appl. No.: 18/854,833

(22) PCT Filed: Apr. 27, 2023

(86) PCT No.: PCT/EP2023/061094
§ 371 (c)(1),
(2) Date: Oct. 7, 2024

(87) PCT Pub. No.: WO2023/209079
PCT Pub. Date: Nov. 2, 2023

(65) Prior Publication Data

US 2025/0327548 A1 Oct. 23, 2025

(30) Foreign Application Priority Data

Apr. 29, 2022 (FR) ....................................... 2204091

(51) Int. Cl.
*F17C 1/00* (2006.01)

(52) U.S. Cl.
CPC ........ *F17C 1/007* (2013.01); *F17C 2203/018* (2013.01); *F17C 2205/013* (2013.01);
(Continued)

(58) Field of Classification Search
CPC ...... F17C 1/00; F17C 1/006; F17C 2203/018; F17C 2205/0404; F17C 2270/1042
See application file for complete search history.

(56) References Cited

U.S. PATENT DOCUMENTS 5,333,465 A 8/1994 McBride
9,109,751 B2 * 8/2015 Schimp .................... F17C 5/06
(Continued)

FOREIGN PATENT DOCUMENTS

CN 202915039 U 5/2013
DE 1812859 10/1969
(Continued)

OTHER PUBLICATIONS

International Search Report issued on Jul. 18, 2023, in PCT/EP2023/061094 filed on Apr. 27, 2023, 2 pages.

*Primary Examiner* — Kyle Armstrong
(74) *Attorney, Agent, or Firm* — Oblon, McClelland, Maier & Neustadt, L.L.P.

(57) ABSTRACT

An underground storage system for storing fluid includes a hole having a bottom, a support element including at least one opening able to receive a joining element, at least one reservoir having a longitudinal axis, a bottom end and a top end, a first closure able to close the reservoir at its bottom end, and a second closure able to close the reservoir at its top end. The top end is able to be joined to the support element via the joining element such that the reservoir is hung inside the hole and such that an axial clearance able to absorb axial thermal expansion of the reservoir remains between the first closure and the bottom.

9 Claims, 4 Drawing Sheets

(52) U.S. Cl.
CPC ................. *F17C 2250/0404* (2013.01); *F17C 2270/0142* (2013.01)

(56) References Cited

U.S. PATENT DOCUMENTS

| | | | | |
|---|---|---|---|---|
| 10,337,669 | B2 * | 7/2019 | Mercer | F17C 5/06 |
| 10,836,579 | B2 * | 11/2020 | Yogev | F17C 1/007 |
| 10,837,601 | B2 | 11/2020 | Mercer et al. | |
| 2022/0333743 | A1 * | 10/2022 | Mercer | F17C 13/06 |

FOREIGN PATENT DOCUMENTS

| | | | |
|---|---|---|---|
| EP | 3 792 467 | A1 | 3/2021 |
| JP | 53-109216 | | 9/1978 |

* cited by examiner

UNDERGROUND STORAGE SYSTEM FOR FLUID STORAGE

TECHNICAL FIELD

The invention relates to the field of underground storage, notably for storing fluids. More particularly, the invention relates to the field of underground storage systems for storing gas, for example for storing hydrogen or for storing oxygen. Even more particularly, the invention relates to the field of storing fluid at high pressures. "High pressures" are understood to be pressures that may range between 100 bar and 1200 bar and more particularly between 200 bar and 500 bar.

The invention also relates to an underground storage method for storing fluids.

TECHNICAL BACKGROUND

One of the emerging technologies for reducing an industry's carbon footprint is to use the hydrogen that is generated by renewable processes, such as wind or solar power processes. The electricity generated by these renewable processes can be used by an electrolyser for producing hydrogen and oxygen, notably on the basis of the electrolysis of water.

This large quantity of hydrogen produced by electrolysis needs to be compressed and stored so that it can then be used on demand either to keep vehicles, such as trucks or cars, powered or to power the electrical grid during times of peak consumption. In that case, in order to produce this electricity, the hydrogen may be supplied either to a turbine or to hydrogen fuel cells. As for the oxygen, it may be advantageous to store it so that it can be used in a field such as agriculture or for medical purposes.

Certain gases, such as hydrogen, are known to be gases that are difficult to contain. For example, their low density requires them to be stored at high pressure, and their small-sized molecules and their low viscosity mean they are likely to leak. Consequently, they must be stored in a perfectly fluidtight device capable of storing large quantities of gas while still meeting strict safety requirements, notably to minimize the risks of leaks. Underground storage is also advantageous for consumers and manufacturers since it makes it possible to very effectively reduce the space used above ground for these storage installations.

Such underground fluid storage systems are generally installed at depths ranging between 10 metres and 50 metres. These storage systems may be installed in ground of varying geological nature, for example in solid rock such as granite or basalt, or in any other type of underground geological structure.

In this regard, the prior art patent U.S. Pat. No. 10,837,601 describes: a device comprising a unit secured in a single underground bore, the unit comprising a plurality of separate vessels attached via at least one retainer, each vessel of the plurality of separate vessels having at least one cap comprising an inlet hole, an outlet hole, and a centre hole, the centre hole being positioned off-centre from a radial centre of a top surface of the cap, the unit being secured in the single underground bore by cement continuously extending between the plurality of vessels to surround the unit and make contact with a sidewall of the underground bore. In addition, the unit is attached to an anchoring element in the vicinity of the bottom of the underground bore. The drawback of such a device is that, to keep the vessels in place in the underground bore, said vessels are secured in cement and attached at the bottom to the anchoring element, and this makes maintenance operations complex, notably when it is necessary to extract one vessel from the unit in order to change it, since the cement and the anchoring element prevent such extraction. However, this type of operation may be necessary, notably in the event of a leak, for a control or maintenance operation. The upkeep and safety of such a device are consequently not the best. Moreover, holding the containers in the cement in this way causes the walls of the vessels to be subjected to considerable compressive loading, increasing the risk of a leak.

SUMMARY

In order to overcome the drawbacks set out above, a first aim of the invention is to make maintenance operations on an underground storage system for fluids, such as gases, easier. In addition, a second aim of the invention is to make it possible to store large quantities of fluids at high pressures while still meeting strict safety requirements. Lastly, a third aim of the invention is to make it possible to store multiple different fluids underground at different pressures in one and the same device, within one and the same storage system.

As a result, the invention provides an underground storage system for storing fluids, said storage system comprising:

- a hole which can be made in a ground, said hole having a bottom,
- a support element comprising at least one opening able to receive a joining element,
- at least one reservoir, said reservoir having a longitudinal axis (1), a bottom end and a top end,
- a first closure means able to close the reservoir at its bottom end, and a second closure means able to close the reservoir at its top end, said top end being able to be joined to the support element via the joining element such that the reservoir is hung inside the hole and such that an axial clearance able to absorb axial thermal expansion of said reservoir remains between the first closure means of the reservoir and the bottom of the hole.

By virtue of these features, the integrity of the reservoir is not compromised by mechanical stresses associated with the axial thermal expansion of the reservoir during fluid injection and withdrawal operations. Specifically, the axial clearance makes it possible to prevent axial thermal expansion during such operations from causing the reservoir to be compressed against the bottom of the hole. Such stresses, applied repeatedly, weaken the fluid tightness of the reservoir, notably at the closure means.

In addition, by contrast to the devices of the prior art, such a system means it is not necessary to use cement to secure the reservoir. The reservoir is therefore only attached to the support element. The reservoir is therefore hung in any fluid that originates from the surrounding area in which the system is placed. For example, the reservoir is hung in air or water that originates from nearby rock formations. It is therefore possible and easy to remove a reservoir from the system.

According to one embodiment, the reservoir is hung substantially vertically.

According to one embodiment, the reservoir is composed of at least one metal tube, said metal tube having at least one end provided with at least one threaded portion.

According to one embodiment, the metal tube has two ends, each of said two ends being provided with at least one threaded portion.

According to one embodiment, the reservoir is composed of at least two metal tubes screwed to each other, so as to form a column of tubes. Two metal tubes can be joined by an integral connection or via a coupling piece such as a sleeve.

According to one embodiment, the axial clearance satisfies the following inequality:

$$G \geq (L^2 * \beta * \alpha) + [20 * \alpha * 80 * (1 - e^{-0.11 * L})] \quad \text{[Math 1]}$$

in which: G is the length of the axial clearance expressed in metres, L represents the length of a reservoir expressed in metres, β represents the geothermal gradient expressed in degrees Celsius per metre, and α represents the coefficient of thermal expansion of the metal expressed in Celsius$^{-1}$.

The geothermal gradient β varies depending on the geological formation in which the storage system is placed. Thus, β is such that $0.02°/m \leq \beta \leq 2°/m$. α represents the coefficient of thermal expansion of the metal expressed in degrees Celsius$^{-1}$. The coefficient of thermal expansion α varies depending on the type of metal from which the tubes used to form a reservoir are made. Thus, a is such that $8*10^{-6o}C^{-1} \leq \alpha - 18*10^{-6o}C^{-1}$.

The use of threaded tubes to produce the reservoir makes it easier to mount and dismount the reservoir. This is particularly advantageous when a tube needs to be changed. Servicing and maintenance of the reservoir are therefore made easier and the safety of the system is improved.

According to one embodiment, the reservoir is composed of a single tube.

According to one embodiment, the tubes used to produce a reservoir are metal tubes, preferably threaded metal tubes. For example, they may be metal tubes made of titanium or tubes made of steel of the kind used in the oil and gas industry, notably the tubes used for producing oil and/or gas production wells.

According to one embodiment, the first closure means and/or the second closure means is able to close the reservoir by screw-fastening. In this case, the thread of said closure means may be a male or female thread. In addition to the thread, the first closure means and/or the second closure means may also comprise a metal seat. The presence of a metal seat contributes to improving the fluid tightness of the closure, and this is particularly advantageous for storing gas, notably for storing hydrogen, which is a gas particularly likely to leak.

According to one embodiment, the first closure means and/or the second closure means is a weld.

Closure means that are able to close the reservoir by screw-fastening are preferred to welds, since the screw-fastened closure means do not significantly change the thickness of the wall of the reservoir at the closure. Thus, with screw-fastening closure means, the mechanical properties of the reservoir at the closure are unchanged. In addition, in the case of storing hydrogen, they make it possible to avoid potential problems of dihydrogen corrosion, which can arise on a weld.

According to one embodiment, the support element comprises a top surface 54 and a bottom surface 56.

According to one embodiment, the support element is laid on the ground or attached to a slab of concrete or cement, said slab being poured on the surface of the ground. The support element can be attached to the slab of concrete or cement by any means known to those skilled in the art.

According to one embodiment, the support element is a circular cylindrical plate or a plate of angular geometrical shape.

According to one embodiment, the support element has at least a surface area ranging between 0.2 $m^2$ and 10 $m^2$, preferably between 0.7 $m^2$ and 4 $m^2$.

According to one embodiment, the support element may be a metal plate.

According to one embodiment, the at least one opening is a through-hole formed in a thickness of the support element.

According to one embodiment, the at least one opening in the support element is a circular opening.

According to one embodiment, the joining element is attached to the top end of the reservoir.

According to one embodiment, the joining element is welded or screwed to the top end of the reservoir.

According to one embodiment, the joining element is tubular and has a flange, said flange being able to rest on a surface of the support element such that, when the joining element is attached to the top end of the reservoir, said reservoir is hung from the support element via the joining element.

According to one embodiment, the system comprises a plurality of reservoirs, each reservoir having a longitudinal axis 1, a bottom end and a top end, said top end of each reservoir being able to be joined to the support element via a joining element such that each reservoir is hung inside the hole.

Such a system, which comprises a plurality of reservoirs, makes it possible to have reservoirs of different lengths within one and the same storage system. This is particularly advantageous in order to not hang a needlessly tall load from the support element. In addition, the length of a reservoir can be adapted in order to make it easier to increase or lower the pressure needed depending on the fluid storage conditions. Thus, different fluids can be stored in the same system.

According to one embodiment, each reservoir is connected to a fluid supply line and to a fluid withdrawal circuit which are specific to it such that, when the storage system comprises a plurality of reservoirs, said reservoirs may be independent of one another.

These features make it possible to store larger quantities of fluid. Notably, for the same hole depth, it is possible to store a large quantity of gas at very high pressures in a plurality of reservoirs. In addition, such a system makes it possible to store a variety of fluids, it being possible for each fluid to be stored in conditions, notably temperature and pressure conditions, that are specific to the fluid and to the intended use of the fluid.

According to one embodiment, each reservoir may be fitted with sensors, such as pressure gauges, thermometers, leak detectors or humidity detectors. In this way, it is possible to control the pressure and the presence of leaks in each reservoir. This is advantageous both for the safety of the system and when not all of the reservoirs store the same fluid. These sensors can also be placed directly in the hole.

According to one embodiment, the system comprises a single reservoir.

According to one embodiment, the length L of a reservoir ranges between 1 metre and 3000 metres, preferably between 10 metres and 2500 metres, more preferably still between 20 metres and 500 metres.

According to one embodiment, the storage system comprises between 1 and 26 reservoirs, preferably between 1 and 14 reservoirs, more preferably still between 1 and 6 reservoirs.

According to one embodiment, the hole has a depth ranging between 10 metres and 2500 metres, preferably between 20 metres and 500 metres, said depth being measured between the surface of the ground and the bottom of the hole.

According to one embodiment, the hole has at least one casing.

According to one embodiment, the casing is made of concrete, cement, or steel.

According to one embodiment, the casing is a casing tube. The casing tube may be cemented.

According to one embodiment, the ground is composed of solid rock, such as granite or basalt. The advantage of realizing the storage system in a ground composed of solid rock is that it is possible to dispense with the casing, thereby simplifying the installation of the system. However, a casing is necessary when the system is realized in loose ground.

According to one embodiment, the hole may be made by boring or by excavating.

According to one embodiment, the hole has a mean diameter ranging between 0.5 metres and 4.5 metres, preferably between 1 metre and 3 metres.

The invention also relates to an underground storage method for storing fluids, said method comprising the following steps:

- making a hole in a ground, said hole having a bottom,
- providing a support element comprising at least one opening able to receive a joining element,
- providing at least one reservoir, said reservoir having a longitudinal axis, a bottom end and a top end,
- providing a first closure means able to close said reservoir at its bottom end, and a second closure means able to close the reservoir at its top end,
- joining said top end to the support element via the joining element such that the reservoir is hung inside the hole and such that an axial clearance able to absorb axial thermal expansion of said reservoir remains between the first closure means of the reservoir and the bottom of the hole.

Definitions

The “bottom end” of the reservoir is understood to be that end of the reservoir that is in the vicinity of the bottom of the hole. This “bottom end” is defined in contrast to the end referred to as “top end” of the reservoir, which is in the vicinity of the support element and therefore the surface of the ground.

“Axial clearance” is understood to be a length which extends along the longitudinal axis 1 of the reservoir and is measured between the first closure means of the reservoir and the bottom of the hole. It should be noted that the position of a reservoir does not have to be perfectly vertical. In this case, the longitudinal axis 1 of the reservoir is at an angle in relation to the vertical in the coordinate system (x; y). This angle has a maximum value of 15°. In this case, the axial clearance G is measured by orthogonal projection onto the vertical axis passing through a point on the first closure means that is closest to the bottom of the hole. In other words, the axial clearance always corresponds to the shortest distance, measured between the bottom of the hole and the first closure means.

A “threaded metal tube” is understood to be a tube comprising at least one end having at least one threaded portion, able to be joined to a threaded metal tube comprising at least one end having at least one complementary threaded portion. The thread may be male or female.

The “bottom of the hole” is understood to be the surface of the bottom of the hole. Thus, when the hole has a casing and said casing is cemented, the expression “bottom of the hole” then denotes the surface of the layer of cement at the bottom of the hole. When the casing is not cemented, the term “bottom of the hole” very simply denotes the surface of the ground at the bottom of the hole.

BRIEF DESCRIPTION OF THE FIGURES

The invention will be better understood, and further objects, details, features and advantages thereof will become more clearly apparent during the course of the following description of several particular embodiments of the invention, which are given solely by way of nonlimiting example with reference to the attached drawings.

It should however be understood that the present application is not limited to the arrangements, structures, features, embodiments and precise appearance that are indicated. The drawings are not to scale and are not intended to limit the scope of the claims to the embodiments shown in these drawings.

Consequently, it should be understood that where features mentioned in the claims are followed by references, said references are provided exclusively to aid comprehension of the claims and under no circumstances limit the scope of said claims.

Figure 1:
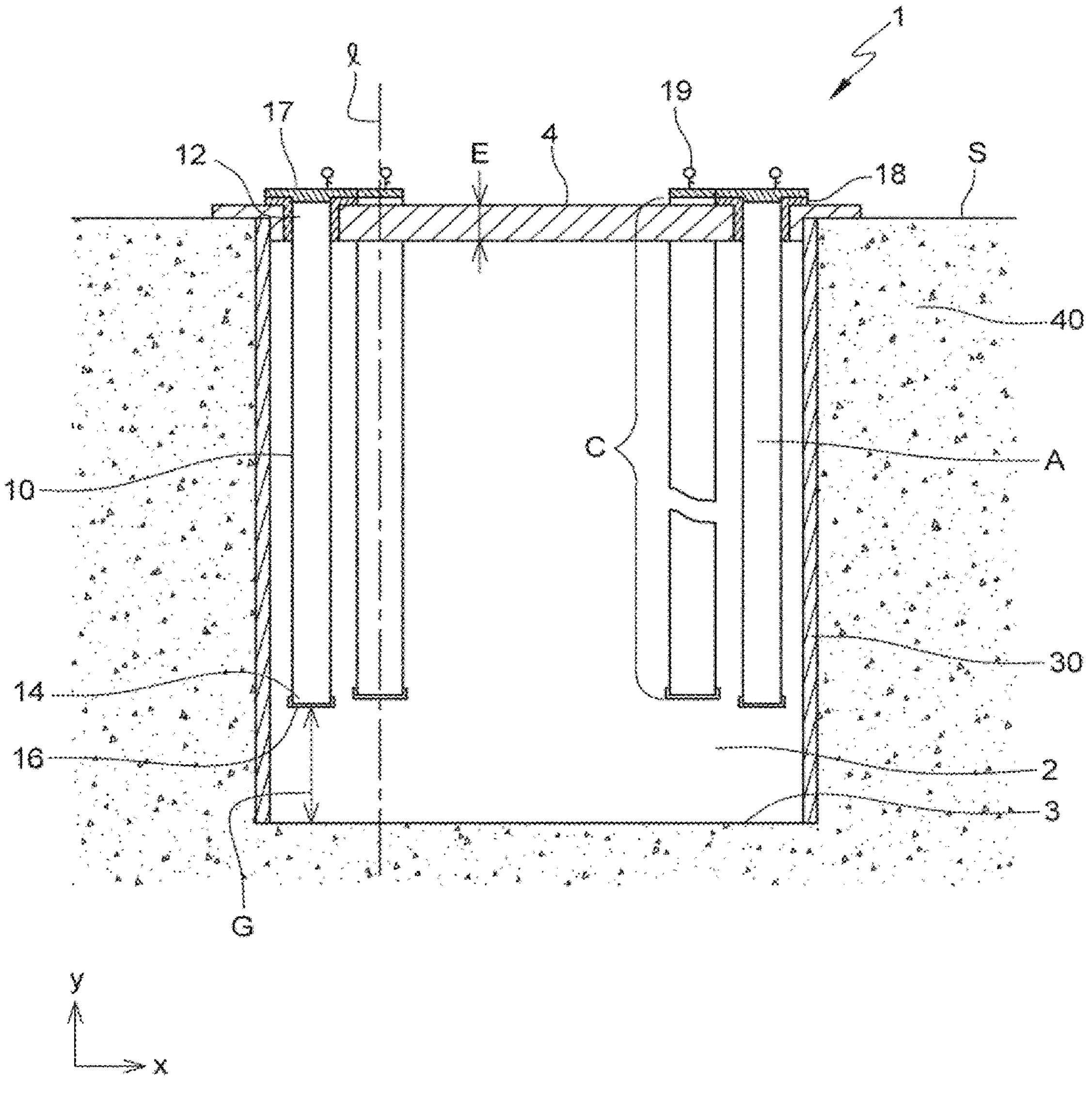

FIG. 1 is a diagram of a sectional view through a storage system according to one embodiment of the invention.

Figure 2:
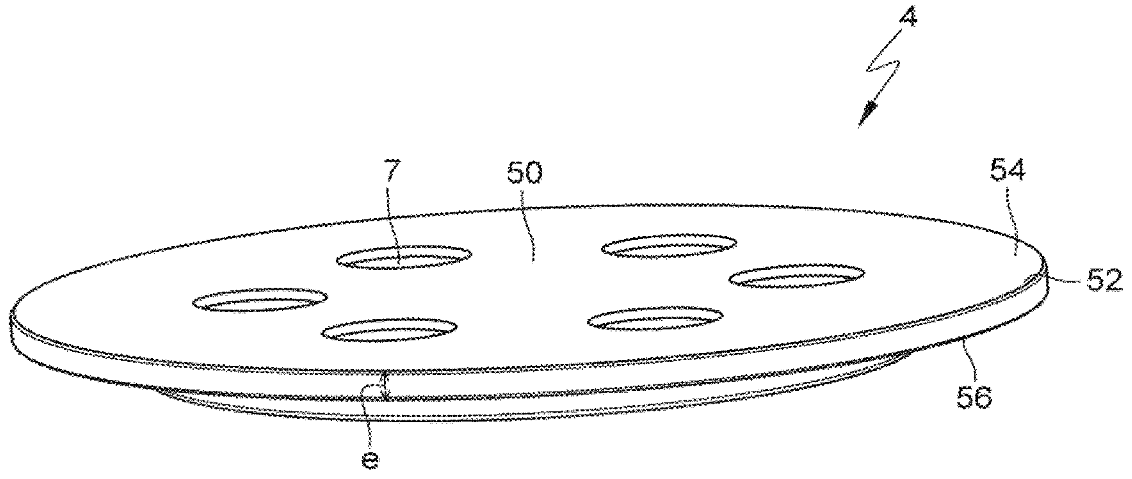

FIG. 2 is a three-dimensional diagram of the support element of the storage system illustrated in FIG. 1, on its own.

Figure 3:
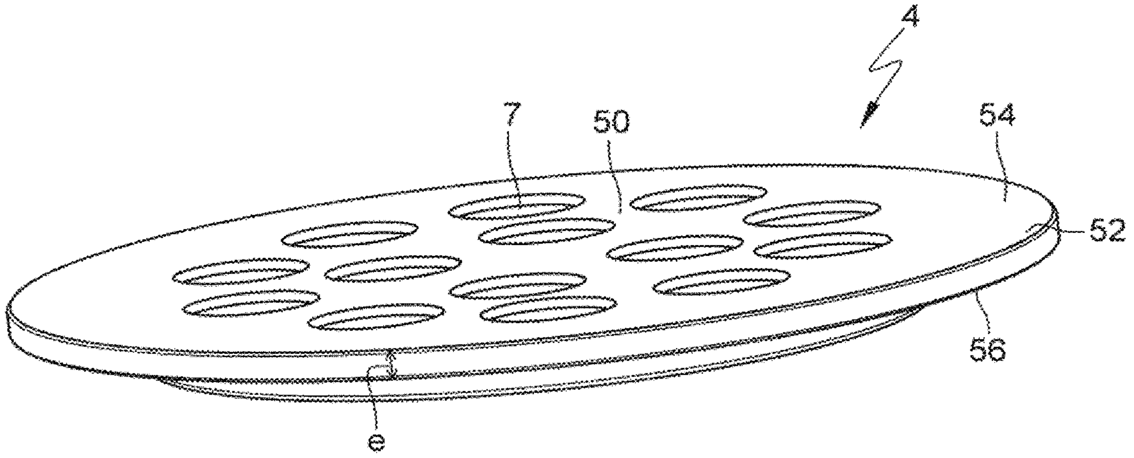

FIG. 3 is a three-dimensional diagram of an alternative support element, on its own, that can be used in one embodiment of the invention.

Figure 4:
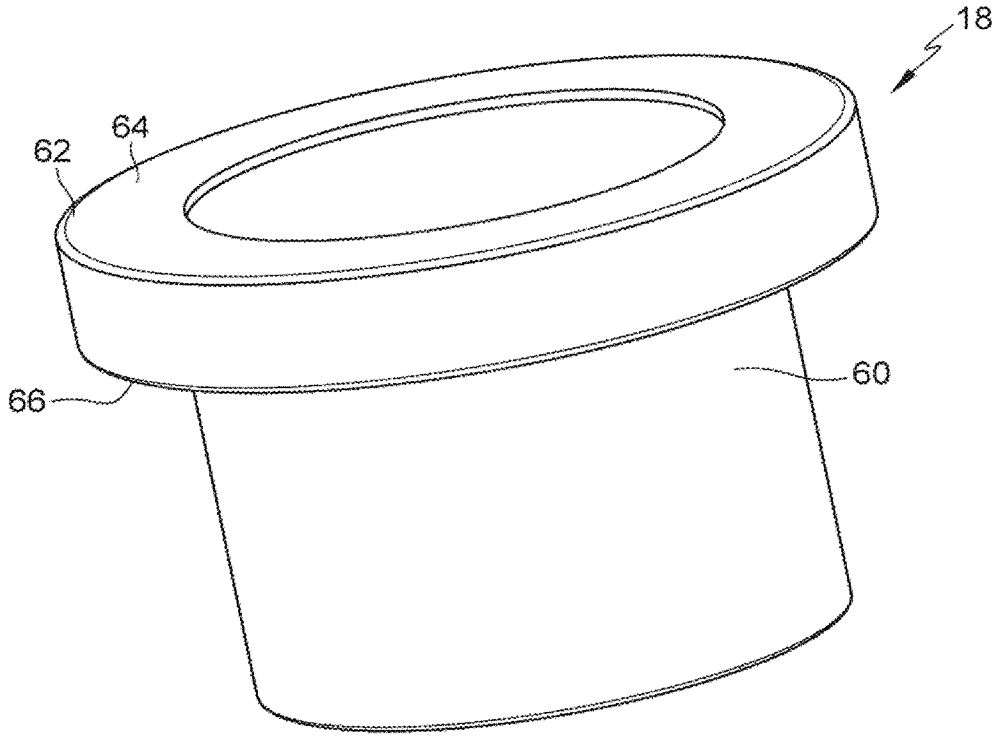

FIG. 4 is a three-dimensional diagram of a joining element that can be used in the storage system illustrated in FIG. 1.

DESCRIPTION OF EMBODIMENTS

FIG. 1 illustrates a sectional view through a storage system 1 according to one embodiment of the invention, in a coordinate system (x; y). The axis x of the coordinate system (x; y) is a horizontal axis, and the axis y of the coordinate system (x; y) is a vertical axis.

The storage system 1 comprises a hole 2 made in a ground 40, a support element 4 laid on a surface S of the ground 40, and six reservoirs 10 hung in the hole 2 from the support element 4 (only four reservoirs are shown in FIG. 1).

The hole 2 has a bottom 3 and comprises a casing 30. The hole 2 can be obtained by boring or by excavating, and has a depth of 500 metres, measured between the ground surface S and the bottom 3. The hole 2 is of substantially circular cylindrical shape and has a mean diameter of 4 metres.

The casing is made of cement and extends vertically from the ground surface S to the bottom 3 of the hole 2.

As shown in FIGS. 1 and 2, the support element 4 is a circular cylindrical plate having a central body 50 and a flange 52, said flange 52 having a bottom surface 56 which rests on the ground surface S. The central body 50 has a first thickness E that may range between 10 mm and 500 mm. The flange 52 has a second thickness e which may range between 5 mm and 200 mm. In the embodiment illustrated in FIGS. 1 and 2, the support element 4 is a metal plate in which the first thickness E is equal to 250 mm and the second thickness e is equal to 100 mm.

The support element 4 also comprises a top surface 54, said top surface 54 being situated opposite the bottom surface 56 of the flange 52, said top surface 54 having a surface area equal to 8.6 $m^2$.

As illustrated in FIG. 2, the support element 4 also comprises six openings 7. The openings 7 are through-holes made in the first thickness E of the body 50 of the support element 4. According to FIG. 3, which illustrates a support element 4 that can be used in one embodiment according to the invention, the support element 4 comprises fourteen openings 7 made in the first thickness E of the body 50.

Each reservoir 10 is hung from the support element 4 via a joining element 18. Thus, for each reservoir 10 of the storage system 1, an axial clearance G remains between the first closure means 16, which closes the reservoir 10 at its bottom end 14, and the bottom 3 of the hole 2. The purpose of this axial clearance G is to absorb any axial thermal expansion of the reservoir 10, which occurs notably during filling and emptying operations. Thus, for each reservoir 10, the dimensioning of the axial clearance G, and notably its length, depends directly on the conditions of the surrounding area of the storage system 1, notably conditions regarding temperature, pressure and the ability of the reservoir 10 to expand when it is subjected to temperature and pressure variations, notably during filling and emptying operations. Thus, the axial clearance G of any reservoir 10 of the storage system 1 satisfies the following inequality:

$$G \geq (L^2 * \beta * \alpha) + [20 * \alpha * 80 * (1 - e^{-0.11*L})] \quad \text{[Math 1]}$$

in which: G is the length of the axial clearance expressed in metres. L represents the length of a reservoir 10 expressed in metres. β represents the geothermal gradient expressed in degrees Celsius per metre. The geothermal gradient β varies depending on the geological formation in which the storage system 1 is placed. Thus, β is such that $0.02°/m \leq \beta \leq 2°/m$. α represents the coefficient of thermal expansion of the metal expressed in degrees $Celsius^{-1}$. The coefficient of thermal expansion α varies depending on the type of metal from which the tubes used to form a reservoir 10 are made. Thus, α is such that $8*10^{-6o}C^{-1} \leq \alpha \leq 18*10^{-6o}C^{-1}$.

The reservoirs 10 are tubular, with a circular cross section, and each have a longitudinal axis (1), a bottom end 14 and a top end 12.

Each reservoir is closed at its top end 14 by a first closure means 16, and each reservoir 10 is closed at its bottom end 12 by a second closure means 17. In the embodiment illustrated in FIG. 1, the bottom end 14 and the top end 12 of each reservoir 10 are threaded ends, and the first closure means 16 and the second closure means 17 also have a thread, said thread complementing the thread of the bottom end 14 and of the top end 12. As a result, the bottom end 14 is fluid tightly closed by screw-fastening with the first closure means 16, and the top end 12 is fluid tightly closed by screw-fastening with the second closure means 17.

The second closure means 17 is fitted with sensors 19 which are pressure gauges, thermometers and leak detectors. Of course, the first closure means 16 may also contain pressure gauges, thermometers and leak detectors. Other types of sensors can be used depending on the objective set.

Each reservoir 10 may be composed of a plurality of tubes A. In the embodiment illustrated in FIG. 1, the reservoirs 10 are composed of multiple threaded tubes A. Thus, the tubes A are screwed to one another so as to form a column C of tubes A. In this way, an assembly composed of a column C, closed at its ends 12 and 14 by the closure means 16 and 17, forms a reservoir 10. A reservoir 10 may also be composed of a single tube A, closed at its ends 12 and 14 by closure means 16 and 17.

Each reservoir 10 is joined to a joining element 18. Each joining element 18 is inserted in an opening 7 and held there by a flange 62 which abuts the top surface 54 of the support element 4. Each joining element 18 is thus hung from the support element 4. In this way, each reservoir 10 is hung from the support element 4 via the joining element 18 to which it is joined.

As illustrated in FIG. 4, a joining element 18 is a tubular metal part of circular cross section which comprises a tubular body 60 and a flange 62.

The body 60 of the joining element 18 is attached, preferably screw-fastened, to the top end 12 of a reservoir 10. It is possible to use welding in an alternative embodiment. The body 60 of the joining element 18 has a complementary male or female thread (not shown) to the thread of the top end 12 of the reservoir 10 to which said joining element 18 is joined. The flange 62 comprises a top surface 64 and a bottom surface 66.

In the embodiment illustrated in FIG. 1, the tubular body 60 of each joining element 18 is inserted in an opening 7 in the support element 4. Each joining element 18 rests on the support element 4 via its bottom surface 66 which abuts the top surface 54 of the support element 4. In addition, each joining element 18 is screw-fastened to a reservoir 10 at the top end 12 of said reservoir 10.

The flange 62 of the joining element 18 thus allows the latter to rest on the top surface 54 of the support element 4. As a result, the joining element 18 does not need to be attached to the support element 4, for example by welding or by screw-fastening, thereby making it easier to assemble the storage system 1, notably in order to hang the reservoirs 10.

The invention claimed is:

1. An underground storage system for storing fluids, said storage system comprising:

a hole made in a ground, said hole having a bottom;

a support element comprising at least one opening;

a joining element inserted in the opening of the support element;

at least one reservoir, said reservoir having a longitudinal axis, a bottom end closed by a first closure means, and a top end closed by a second closure means;

the joining element being attached to the top end, and said top end being joined to the support element via the joining element such that the reservoir is hung inside the hole and such that an axial clearance able to absorb axial thermal expansion of said reservoir remains between the first closure means of the reservoir and the bottom of the hole.

2. The storage system according to claim 1, wherein the reservoir comprises at least one metal tube, said metal tube having at least one end provided with at least one threaded portion.

3. The storage system according to claim 1, wherein the reservoir comprises at least two metal tubes screwed to each other so as to form a column of tubes.

4. The storage system according to claim 1, wherein the axial clearance satisfies the following inequality:

$$G \geq (L^2 * \beta * \alpha) + [20 * \alpha * 80 * (1 - e^{-0.11*L})] \quad \text{[Math 1]}$$

in which: G is a length of the axial clearance expressed in metres, L represents the length of the reservoir expressed in metres, β represents a geothermal gradient expressed in degrees Celsius per metre, and a represents a coefficient of thermal expansion of a metal expressed in metres per degree Celsius.

5. The storage system according to claim 1, wherein the first closure means and/or the second closure means is configured to close the reservoir by screw-fastening.

6. The storage system according to claim 1, wherein said system comprises a plurality of reservoirs, each reservoir having a longitudinal axis, a bottom end and a top end, said top end of each reservoir being able to be joined to the support element via a joining element such that each reservoir is hung inside the hole.

7. The storage system according to claim 1, wherein the hole has at least one casing.

8. The storage system according to claim 7, wherein the casing is made of concrete, cement, or steel.

9. An underground storage method for storing fluids, said method comprising:

making a hole in a ground, said hole having a bottom;

providing a support element comprising at least one opening able to receive a joining element;

providing at least one reservoir, said reservoir having a longitudinal axis, a bottom end and a top end;

providing a first closure means configured to close said reservoir at the bottom end, and a second closure means configured to close the reservoir at the top end; and joining said top end to the support element via the joining element, and inserting the reservoir and the joining element in the opening such that the reservoir is hung inside the hole and such that an axial clearance able to absorb axial thermal expansion of said reservoir remains between the first closure means of the reservoir and the bottom of the hole.

* * * * *